United States Patent [19]

Stearns, III

[11] Patent Number: 4,640,462

[45] Date of Patent: Feb. 3, 1987

[54] WATER DRIVEN SHOWER MASSAGER

[76] Inventor: R. Dewey Stearns, III, 323 River, Northville, Mich. 48167

[21] Appl. No.: 742,774

[22] Filed: Jun. 10, 1985

[51] Int. Cl.[4] .......................... B05B 1/34; B05B 3/06; A01G 27/00; B05C 1/00

[52] U.S. Cl. .................................... 239/383; 239/258; 239/145; 15/230.17

[58] Field of Search ........ 239/145, 256, 258, 380–383; 128/37, 64, 66; 15/230.17

[56] References Cited

U.S. PATENT DOCUMENTS

| | | | |
|---|---|---|---|
| Re. 26,589 | 5/1969 | Murov et al. | 15/22 |
| 616,032 | 12/1898 | Struhs | 239/258 |
| 890,709 | 6/1908 | Richwood | 128/37 |
| 1,198,544 | 9/1916 | Heal | 128/37 |
| 1,210,929 | 1/1917 | Gruber et al. | 128/37 |
| 1,225,752 | 5/1917 | Behm | 128/37 |
| 1,844,183 | 2/1932 | Scarpa | 239/383 X |
| 2,701,563 | 2/1955 | Fortin | 128/66 |
| 3,283,352 | 11/1966 | Hu | 15/22 |
| 3,386,122 | 6/1968 | Mathison | 15/230.17 |
| 3,468,306 | 9/1969 | Heitzman | 128/66 |
| 3,509,874 | 5/1970 | Stillman | 128/66 |
| 3,720,204 | 3/1973 | Wojtowicz | 128/64 |
| 3,770,200 | 11/1973 | Bauer et al. | 239/102 |
| 3,963,179 | 6/1976 | Tomaro | 239/101 |
| 4,141,502 | 2/1979 | Grohe | 239/381 |
| 4,313,432 | 2/1982 | Sievers | 128/37 |
| 4,441,488 | 4/1984 | Macabee | 128/66 |
| 4,458,676 | 7/1984 | Pileggi | 128/53 |

*Primary Examiner*—Johnny D. Cherry
*Assistant Examiner*—Patrick N. Burkhart
*Attorney, Agent, or Firm*—Harness, Dickey & Pierce

[57] ABSTRACT

A handheld water driven shower massager unit is provided which includes a housing having an internally disposed rotatable nozzle which is caused to rotate by the high velocity discharge of water from the nozzle. By eccentrically weighting the water discharge nozzle, an oscillating vibrational motion is applied to the entire device, thereby providing a massaging effect when pressed against the user. When held away from the user, the unit functions as a source of water spray for cleansing. The performance and characteristics of the unit can be modified through varying the flow rate of water through the unit, by changing the nozzle configuration, or by changing the angle of water discharge from the nozzle. Additionally, various cleansing and massaging pads can be removably attached to the unit in accordance with the needs of the user.

18 Claims, 4 Drawing Figures

WATER DRIVEN SHOWER MASSAGER

BACKGROUND AND SUMMARY OF THE INVENTION

This invention relates to a bathing and cleansing device and particularly to a handheld shower massager device which provides a dispersed spray of water for cleansing and further may be used as a massager when the unit is pressed into contact with the user.

Numerous designs of handheld shower massager units are currently known in the prior art. Some of the prior art units are designed to provide a pulsating water spray for cleansing and bathing. Many of these devices employ internally moving mechanisms which provide a pulsating spray or cause air to be entrained in the water. Other prior art devices are designed primarily as water driven massagers for therapeutic massaging, scrubbing, washing, etc. Water driven massagers typically employ an unbalanced impeller or fluid motor to provide the desired orbital or vibratory motion. Several devices according to the prior art attempt to combine the features of providing a pulsating spray with a massage action.

This invention seeks to provide a number of improvements in structure, performance, and cost as compared with units currently known. The shower massager unit according to this invention includes only a single moving part, thereby making it very simple to manufacture and providing dependability of operation. The unit in accordance with this invention features high efficiency and reliability since there are no mechanical interfaces among various moving components such as gears, cams, fluid motors, etc. Further, enhanced efficiency is provided since the components of the device are designed to discharge water only, unlike some of the systems according to the prior art which require the entraining of air or creation of a water stream which must interact in a certain manner with other components of the device. The device in accordance with this invention further provides an evenly distributed spray of water, thereby providing a superior bathing and cleansing effect. The shower massager in accordance with this invention is easily adaptable between different uses and preferences through employing detachably secured pads to the device, which can be used for scrubbing, shampooing, massaging, etc. In accordance with one embodiment of this invention, variations in the vibration action and intensity, water spray pattern, and impact force are provided through a very simple adjustment which can be made by the user to optimize the mechanism for his or her particular needs.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
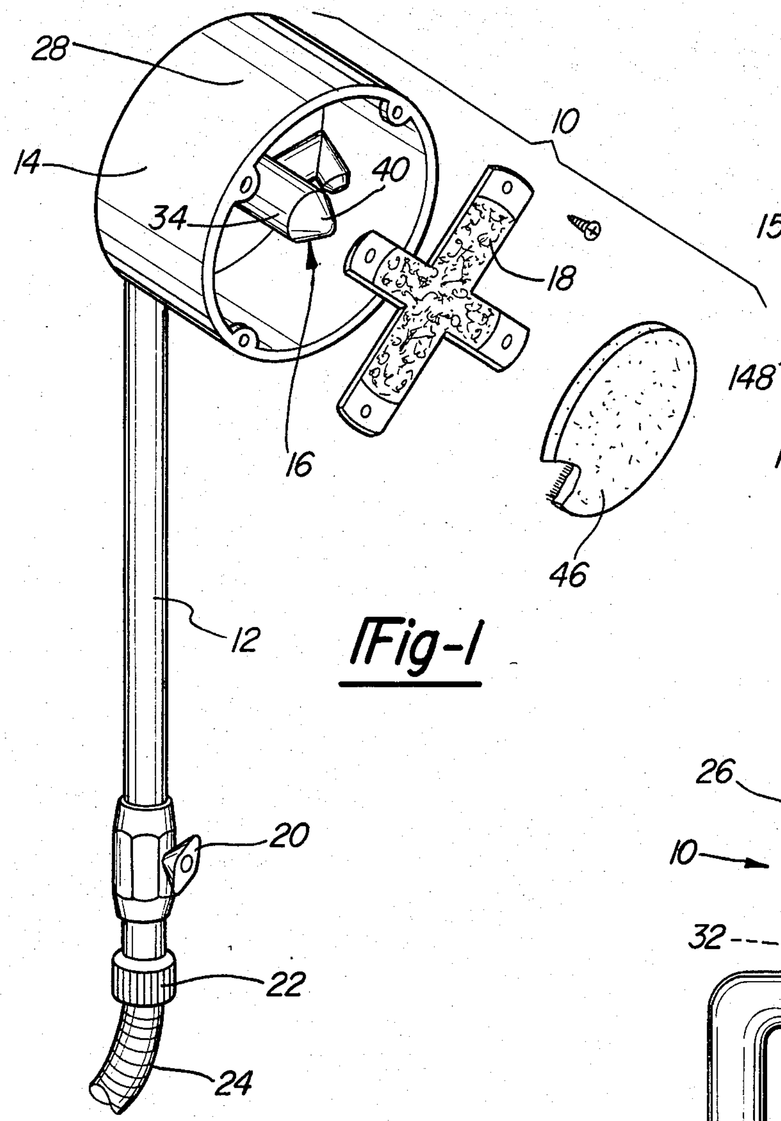
FIG. 1 is a partially exploded pictorial view of a water driven shower massager in accordance with this invention showing the housing, cross member, pad, and the internal spindle assembly.
Figure 2:
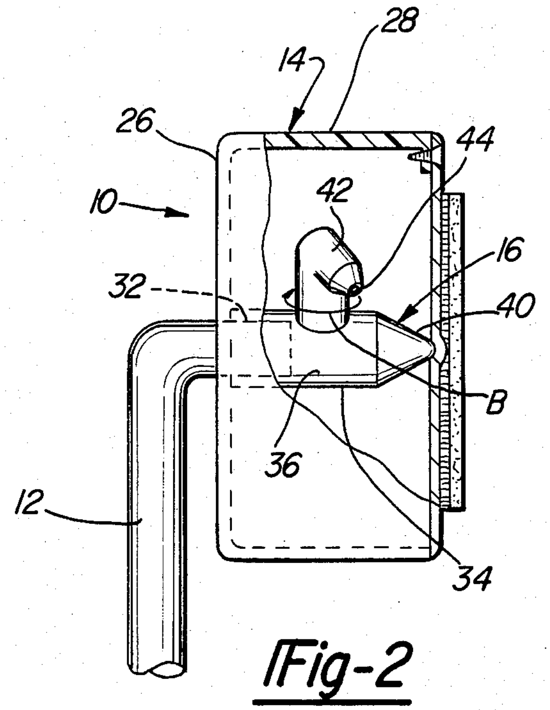
FIG. 2 is a side view, partially in elevation and partially in section, showing the internal components of the device.
Figure 3:
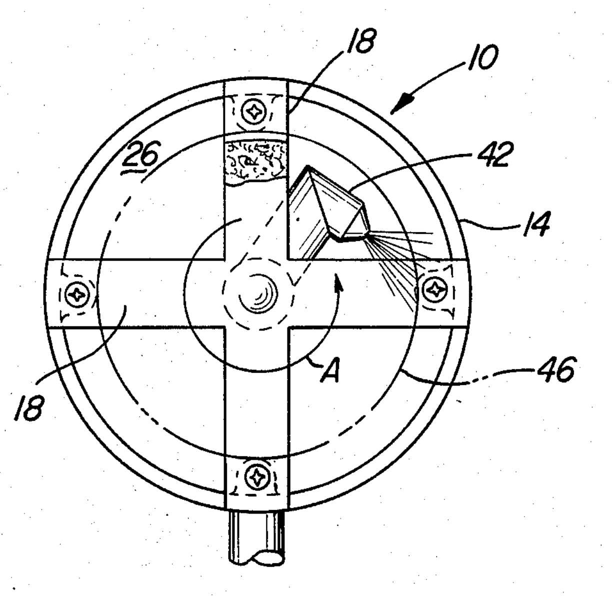
FIG. 3 is a frontal elevational view of the water driven shower massager showing the direction of rotation of the water discharging nozzle.

A water driven shower massager unit in accordance with this invention is particularly shown by FIGS. 1, 2, and 3 and is generally designated by reference number 10. Shower massager 10 principally includes wand 12, housing 14, spindle assembly 16, and cross member 18.

Wand 12 is preferably a generally rigid hollow conduit for the conduction of pressurized water and further enables device 10 to be conveniently grasped and manipulated by a user. One end of wand 12 preferably incorporates a water control valve 20 having a valve element which enables the user to modulate the rate of water flow through wand 12. Wand 12 further includes couple 22 enabling attachment to a flexible hose 24. The opposing end of wand 12 is preferably bent to a generally 90-degree angle as best shown in FIG. 2 and is rigidly fixed to housing 14.

Housing 14 is generally drum-shaped, having an enclosed back wall 26 and cylindrically extending side 28 terminating at an opened end. Wand 12 has an end portion 32 which pierces through housing back wall 26 and extends a small distance within the interior cavity of housing 14.

Spindle assembly 16 includes spindle member 34 having an internal bore 36 which fits over wand end portion 32, as best shown in FIG. 2. Spindle member 34 may be mounted for relative rotation with respect to wand end portion 32 in any conventional manner. As shown in FIGS. 1, 2, and 3 herein, spindle member 34 is mounted for rotation with respect to wand end portion 34 by loosely fitting it over the end portion. Spindle member 34 is maintained in position over wand end portion 32 by cross member 18 which is connected to housing 14 by any conventional means (threaded fasteners are shown). Spindle member 34 contacts cross member 38 at pointed end 40. Spindle member 34 further includes a laterally extending bore (not shown) which communicates with water discharge nozzle 42. Water discharge nozzle 42 includes an opening 44 which discharges a stream of water along an axis which is offset from the axis of rotation of spindle member 34. Opening 44 of nozzle 42 imposes a flow restriction causing a fluid pressure to be developed in the nozzle such that water is discharged at high velocity from opening 44. This configuration for water discharge nozzle 42 causes spindle assembly 16 to rotate rapidly in the direction designated by A in FIG. 3 as water is discharged from the nozzle. Since spindle assembly 16 is eccentrically weighted, i.e. has a center of mass displaced from the axis of rotation of the spindle assembly, an oscillating force is imparted onto shower massager unit 10 through rotation of spindle assembly 16, causing the shower massager 10 to vibrate. In a preferred embodiment of this invention, water discharge nozzle 42 is rotatable with respect to spindle member 34 as shown by the circular arrow B in FIG. 2. This feature enables the user to change the direction of discharge of water discharge nozzle 42, thereby changing the vibration and water discharge pattern provided by shower massage 10. For a given flow rate of water, the rate of rotation of spindle assembly 16 will decrease as the direction of nozzle 42 is turned to spray water along an axis parallel to the axis of rotation of the spindle assembly.

Cross member 18 is connected to housing 14 to restrain axial movement of spindle assembly 16. Cross member 18 includes opened areas which enable water discharged from nozzle 42 to escape from housing 14. Cross member 18 preferably includes a means for releasably securing pad 46 thereto such as "VELCRO" or other hook and loop type fasteners. Pad 46 can have any desired surface characteristics; for example, it may be comprised of a soft sponge cloth material for cleansing, scrubbing, shampooing, massaging etc. Pad 46 is easily removed and replaced so that the user may select from a variety of different pads as desired. Pad 46 is preferably porous so that water can be discharged through the pad and come into contact with the user. As shown, pad 46 is smaller in diameter than housing 28 to provide clearance for water discharge when unit 10 is used as a massager. If desired, housing 28 may be modified by incorporating removable or permanently attached extending bristles from the edge of the housing for enhanced scrubbing action.

Construction of water driven shower massager unit 10 is achieved merely by axially assembling the various components as shown in FIG. 1. Spindle assembly 16 is loaded onto wand 12 and cross member 18 is then installed.

Any source of pressurized water for shower massager 10 can be employed. For example, a "T" type fitting can be used which is attached to a shower head which permits water to be distributed to the shower massager 10 and also through the shower discharge head. This configuration enables shower massager 10 to be used along with a conventional showerhead. Alternately, shower massager 10 can receive all of the discharge from the shower outlet or can be supplied from another source of water in a bathroom shower stall or bathtub.

In operation, water is conducted through wand 12 which causes spindle assembly 16 to rotate rapidly, thereby imparting an oscillatory vibrating motion to the device. When pressed against the user, the device acts to provide soothing and therapeutic massage. A pad 46 is preferably attached to cross member 38 for this use. Changes in the vibration intensity can be made through varying the flow rate of water through the device, by changing the orifice size of water discharge nozzle 42, or by changing the angle of water discharge from water discharge nozzle 38 as shown in FIG. 2. Alternately, the device 10 can be used as a handheld shower head by removing pad 46 or by using a very porous pad and simply directing the discharge of the nozzle against the user. When used in this manner, the device produces a helical stream of discharged water which provides a pulsed sensation for the user. Again, the effect provided by shower massager unit 10 can be varied in a number of manners. For example, by changing the rotating angle of water discharge nozzle 42, water can be made to initially strike the inside of housing 14, thereby causing it to lose much of its kimetoc energy. If, however, the angle of discharge from nozzle 42 is changed so that the water does not directly contact the contact housing 14, a direct stream of water strikes the user providing a more intense water spray impact. Shower massager 10 can be provided with an assortment of spindle assemblies 16 and/or water discharge nozzles 42 which provide various spray and vibration charactistics in accordance with the user's needs.

The shower massager unit 10 in accordance with this invention provides ease of manufacture and simplicity to an extreme since it has only a single moving component (spindle assembly 16). The minimization of moving parts inherently provides dependability of operation and simplicity. Shower massager 10 is further inexpensive to manufacture since the nozzle merely discharges water, and the requirement for entraining air as needed by some prior art constructions is avoided. The device further provides a desirable 360-degree distribution of water.

Figure 4:
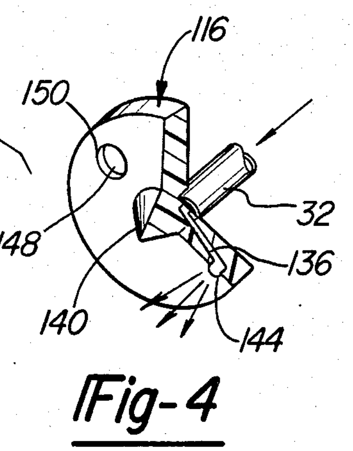
FIG. 4 is a pictorial view partially in section of a second embodiment of a spindle assembly according to this invention.

FIG. 4 illustrates a second embodiment of a spindle assembly 116. Spindle 116 has internal water flow passage 136 which terminates at orifice 144 which is oriented to impart a rotational urging force like nozzle 44. Spindler 116 further is mounted over wand end portion 32 and may be supported by pointed end 140. Spindle 116 may be unbalanced by any means such as by the installation of weight 148 in pocket 150. The principle advantage of spindle assembly 116 is that during rotation, it would not tend to engage and wind up the user's hair when used for shampooing. Furthermore, if housing 14 becomes filled with water, the hydrodynamic drag would be very low for nozzle 144 enabling it to continue rapid rotation in such conditions.

While the above description constitutes the preferred embodiments of the present invention, it will be appreciated that the invention is susceptible to modification, variation and change without departing from the proper scope and fair meaning of the accompanying claims.

What is claimed is:

1. A water driven cleansing device comprising:

a housing having a generally opened end, a spindle assembly rotatably within said housing about an axis of rotation, said spindle having a water discharge nozzle which rotates with said spindle assembly and which discharges water along a path which is offset from said axis of rotation of said spindle assembly, said spindle assembly further having a center of mass offset from said axis of rotation due at least in part to the location of said nozzle with respect to said spindle assembly. and means for conducting water to said spindle assembly such that water is discharged from said nozzle causing said spindle assembly to rotate within said housing, said rotation causing said cleansing device to vibrate and causing said device to emit a stream of water from said housing opened end.

2. The water driven cleansing device according to claim 1 further comprising, a wand defining a handle enabling a user to conveniently hold said device.

3. The water driven cleansing device according to claim 2 wherein said means for conducting water comprises, said wand defining an internal bore communicating with said spindle assembly.

4. The water driven cleansing device according to claim 1 further comprising, means for connecting a pad to said housing opened end.

5. The water driven cleansing device according to claim 4 wherein said means to connect a pad comprises a cross member attached to said housing and spanning said opened end.

6. The water driven cleansing device according to claim 5 further comprising said pad being removably attachable to said cross member.

7. The water driven cleansing device according to claim 1 wherein said water discharged from said nozzle defines an angle of discharge with respect to said axis of rotation and wherein said angle of discharge of said water from said water discharge is adjustable, thereby changing the magnitude and character of said vibration and said water stream.

8. The water driven cleansing device according to claim 1 further comprising, means for deflecting said water discharged from said water discharge nozzle.

9. The water driven cleansing device according to claim 8 wherein said means for deflecting comprises a substantial portion of said water from said water discharge nozzle striking said housing before being discharged from said housing opened end.

10. The water driven cleansing device according to claim 1 wherein said spindle assembly is formed in the shape of a flat disc.

11. A water driven cleansing device, comprising:

a drum-shaped housing having a generally opened end, a generally closed end, and a generally cylindrical side surface, a wand having a hollow interior bore for conduction of water, said wand having an end portion affixed to said housing generally closed end, a spindle rotatable within said housing about an axis of rotation and having an internal cavity in communication with said wand interior bore, and a water discharge nozzle affixed to said spindle and rotatable therewith for discharging water along a path which is offset from said axis of rotation of said spindle, said spindle and said water discharge nozzle having a combined center of mass which is offset from said axis of rotation of said spindle due at least in part to the location of said nozzle with respect to said spindle assembly such that water discharged from said water discharge nozzle causes said spindle to rotate, thereby vibrating said device.

12. The water driven cleansing device according to claim 11 further comprising, means for retaining said spindle member within said housing.

13. The water driven cleansing device according to claim 12 wherein said means for retaining said spindle member comprises a cross member spanning said housing generally opened end and trapping said spindle member within said housing.

14. The water driven cleansing device according to claim 13 wherein said spindle member has a pointed end in contact with said cross member and wherein said pointed end is urged against said cross member by fluid pressure exerted by said water.

15. The water driven cleansing device according to claim 13 further comprising, a pad detachably connected to said cross member.

16. The water driven cleansing device according to claim 11 wherein said water discharged from said nozzle defines an angle of discharge with respect to said axis of rotation and wherein said water discharge nozzle is rotatable with respect to said spindle whereby said angle of discharge of water from said nozzle can be varied.

17. The water driven cleansing device according to claim 11 wherein said spindle assembly being formed in the shape of a flat disc.

18. A water driven cleansing device, comprising:

a drum-shaped housing having a generally opened end, a generally closed end, and a generally cylindrical side surface, a wand having a hollow interior bore for conduction of water, said wand having an end portion affixed to said housing generally closed end, a spindle rotatable within said housing about an axis of rotation and having an internal cavity in communication with said wand interior bore, a water discharge nozzle affixed to said spindle and rotatable therewith for discharging water along a path which is offset from said axis of rotation of said spindle, said spindle and said water discharge nozzle having a combined center of mass which is offset from said axis of rotation of said spindle such that water discharged from said water discharge nozzle causes said spindle to rotate, thereby vibrating said device, means for retaining said spindle member within said housing comprising a cross member spanning said housing generally opened end and trapping said spindle member within said housing, and a pad detachably connected to said cross member.

* * * * *